US006879805B2

(12) United States Patent
Epstein

(10) Patent No.: US 6,879,805 B2
(45) Date of Patent: Apr. 12, 2005

(54) TEST FORM HAVING A REMOVABLE OPAQUE LAYER, AND METHOD AND APPARATUS FOR PRINTING ON THE FORM

(76) Inventor: Michael L. Epstein, 163 Tunic Flower La., Princeton Junction, NJ (US) 08550

( * ) Notice: Subject to any disclaimer, the term of this patent is extended or adjusted under 35 U.S.C. 154(b) by 210 days.

(21) Appl. No.: 10/265,827

(22) Filed: Oct. 7, 2002

(65) Prior Publication Data

US 2004/0067478 A1 Apr. 8, 2004

(51) Int. Cl.⁷ .................................................. G09B 7/00
(52) U.S. Cl. .................... 434/353; 434/327; 434/328; 434/346; 434/348; 434/354; 434/355; 434/356; 434/358; 434/359; 434/363
(58) Field of Search ................... 434/327, 328, 434/346, 348, 353, 354, 355, 356, 358, 359, 362, 363, 364; 283/72, 74, 901, 84; 428/41.7, 42.1, 201, 202, 204, 913, 206, 207

(56) References Cited

U.S. PATENT DOCUMENTS

| | | | |
|---|---|---|---|
| 2,764,821 A | 10/1956 | Buitenkant ........................ | 35/9 |
| 2,961,777 A | 11/1960 | Neville et al. .................... | 35/9 |
| 2,986,820 A | 6/1961 | Neville et al. .................... | 35/9 |
| 3,055,117 A | 9/1962 | Bernstein et al. ................. | 36/9 |
| 3,264,760 A | 8/1966 | St. Clair ....................... | 464/346 |
| 3,283,416 A | 11/1966 | Taylor et al. ............... | 434/346 |
| 3,499,235 A | 3/1970 | Cornell, III et al. ......... | 434/346 |
| 3,503,142 A | 3/1970 | Wolowicz et al. ........... | 434/346 |
| 3,617,324 A * | 11/1971 | Thomas ....................... | 430/201 |
| 3,800,439 A | 4/1974 | Sokolski et al. ............. | 434/358 |
| 3,918,174 A | 11/1975 | Miller et al. ................. | 434/346 |
| 3,938,993 A | 2/1976 | Royka et al. .................. | 96/1.4 |
| 3,983,364 A | 9/1976 | Firehammer et al. ......... | 434/358 |
| 4,095,824 A | 6/1978 | Bachman ........................ | 283/6 |
| 4,337,051 A | 6/1982 | Donlon ........................ | 434/328 |
| 4,360,548 A * | 11/1982 | Skees et al. ................... | 428/29 |
| 4,508,513 A | 4/1985 | Donovan .................... | 434/346 |
| 4,964,642 A | 10/1990 | Kamille ....................... | 434/346 |
| 5,085,587 A | 2/1992 | DesForges et al. ......... | 434/358 |
| 5,123,658 A | 6/1992 | Elfanbaum .................. | 434/346 |
| 5,193,854 A | 3/1993 | Borowski, Jr. et al. ....... | 283/87 |
| 5,403,039 A | 4/1995 | Borowski, Jr. et al. ....... | 283/87 |
| 5,431,452 A * | 7/1995 | Chang et al. ................. | 283/95 |
| 5,484,169 A * | 1/1996 | Chang et al. ................. | 283/67 |
| 5,542,710 A | 8/1996 | Silverschotz et al. ......... | 283/91 |
| 5,562,284 A | 10/1996 | Stevens ...................... | 273/139 |
| 5,855,514 A * | 1/1999 | Kamille ....................... | 463/17 |
| 6,210,171 B1 | 4/2001 | Epstein et al. .............. | 434/346 |

\* cited by examiner

*Primary Examiner*—Chanda L. Harris
(74) *Attorney, Agent, or Firm*—Kenneth Watov; Watov & Kipnes, P.C.

(57) ABSTRACT

A test form comprises a substrate, a chromogenic material applied to at least a top surface portion of the substrate, a removable opaque layer overlaying a portion of the chromogenic material, the chromogenic material being adapted to irreversibly generate a visible change in color to form a desired indicia, upon exposure of the area to an activating agent such as heat to predetermined areas on a bottom portion of the substrate, all without disturbing the opaque layer covering the indicia so produced. The present invention is further directed to a method and system for customizing a test form having a removable opaque layer, by permitting printing under the opaque layer to be concealed until the corresponding opaque layer covering the indicia is removed.

24 Claims, 10 Drawing Sheets

IMMEDIATE FEEDBACK ASSESSMENT TECHNIQUE (IFAT)
NAME _____ TEST# _____
SUBJECT _____ FORM 1010
SCRATCH OFF COVERING TO EXPOSE ANSWER

| # | T/A | F/B | C | D |
|---|---|---|---|---|
| 1. |  |  | X |  |
| 2. | X |  |  |  |
| 3. |  |  | X |  |
| 4. |  |  | X |  |
| 5. | X |  |  |  |
| 6. |  | X |  |  |
| 7. |  |  |  | X |
| 8. | X |  |  |  |
| 9. |  | X |  |  |
| 10. |  |  | X |  |
| 11. |  |  | X |  |
| 12. | X |  |  |  |
| 13. | X |  |  |  |
| 14. |  |  | X |  |
| 15. |  |  |  | X |
| 16. |  |  | X |  |
| 17. |  |  | X |  |
| 18. | X |  |  |  |
| 19. |  |  | X |  |
| 20. |  | X |  |  |
| 21. |  |  | X |  |
| 22. |  |  |  | X |
| 23. |  | X |  |  |
| 24. |  |  | X |  |
| 25. |  |  |  | X |
| 26. |  | X |  |  |
| 27. |  | X |  |  |
| 28. |  | X |  |  |
| 29. |  |  | X |  |
| 30. |  |  | X |  |
| 31. |  |  |  |  |
| 32. |  | X |  |  |
| 33. | X |  |  |  |
| 34. |  |  |  | X |
| 35. | X |  |  |  |
| 36. |  |  |  | X |
| 37. | X |  |  |  |
| 38. | X |  |  |  |
| 39. |  | X |  |  |
| 40. |  |  |  | X |
| 41. | X |  |  |  |
| 42. |  |  |  | X |
| 43. | X |  |  |  |
| 44. |  | X |  |  |
| 45. |  |  |  | X |
| 46. |  |  |  | X |
| 47. | X |  |  |  |
| 48. |  | X |  |  |
| 49. |  |  | X |  |
| 50. |  | X |  |  |

TEST FORM HAVING A REMOVABLE OPAQUE LAYER, AND METHOD AND APPARATUS FOR PRINTING ON THE FORM

RELATED PATENT

This application is related to U.S. Pat. No. 6,210,171, entitled "METHOD AND APPARATUS FOR MULTIPLE CHOICE TESTING WITH IMMEDIATE FEEDBACK FOR CORRECTNESS OF RESPONSE," issued on Apr. 3, 2001.

FIELD OF THE INVENTION

The present invention relates generally to documents, and more particularly to a test form having a removable opaque layer, and to a method and system for customizing such a form for use in educational testing.

BACKGROUND OF THE INVENTION

Research in learning has shown that informative feedback associated with problem solving tasks such as test taking serves an important role in the learning process for individuals. Research has further shown that maximum benefit is accrued when the delay between the completion of a task and the recognition of the informative feedback is minimal. Learning occurs as a function of experience and feedback which can lead to a relatively permanent change in behavior or mental associations, especially when the experience and feedback are strongly perceived. Research has shown that a delay as short as a few seconds in relaying informative feedback for a problem solving task can impede the learning process and reduce overall retention.

Standardized testing typically comprises multiple-choice formats where the answer forms include a series of spaces representing four to five answer choices in a row for each question. When such a test is administered, the test taker is usually required to darken or mark a space usually labeled with a letter (i.e., A, B, C, or D) to indicate the selected answer choice corresponding to a question. Once the test taker completes the test, the answer form is collected and then assessed by the test administrator to determine and tally the correct answer choices. The test taker is not informed of the correct answer choices at the time the selection is made during the test, and usually receives an indication of the correct answer choices at a later time.

During the assessment process, the answer forms are often scored automatically by a scanning device that is sensitive to the darkened answer space in a row of answer spaces for each question, for example. The "correct" answer choice is the answer space on the answer form (labeled A, B, C or D, etc.), which corresponds to a similarly labeled answer choice on the test answer form. If an incorrect answer space is darkened on the answer form, or if more than one answer space in a given row of options is darkened, the scanning device automatically records the test taker's selection as incorrect for that particular question. The total number of correctly marked answer spaces is typically recorded by the scanning device and reported on the test answer form. The capacity of scannable, multiple-choice answer forms to facilitate the evaluation of large numbers of test takers with ease has made them an extremely popular educational tool.

Once the answer forms are evaluated, the test taker finally receives the test results showing the correct and incorrect answer choice selections. At this time, the questions of the test are not easily recalled by the test taker, and the advantage of using informative feedback to facilitate learning is lost. An answer form that would provide immediate informative feedback for the correctness of a test taker's answer choice selection can greatly facilitate learning and improve retention.

An optimal examination system is disclosed in U.S. Pat. No. 6,210,171, the content of which is incorporated herein by reference. The system disclosed includes a multiple-choice type answer form having a series of answer spaces each containing printed indicia designating correct or incorrect answer choices and a removable opaque layer covering each answer space to conceal the printed indicia underneath. Such an answer form can assess the test taker's knowledge while providing the test taker with immediate feedback of the correct and incorrect answer choices selected, thereby teaching new knowledge while at the same time assessing current knowledge. The answer form provides efficient administration and effectively facilitates learning over the methodology described above which do not provide affirming and corrective feedback at the time the answer choice is selected.

However, such answer forms do not provide the test administrator with the flexibility and security in selecting or customizing the answer space indicia (i.e., correct, incorrect, or partial credit) once the forms are covered with the removable opaque layer by the form maker or form provider. By limiting the combination or sequence of correct options of the answer key to those provided by the form maker or form provider, the correct answer choices may be readily predicted by the test taker through knowledge of a particular answer key combination, thereby compromising the integrity of the test. Furthermore, it may be desirable for the test administrator to print customized indicia on the answer form without disturbing the removable opaque layer to assign partial credit or add specific comments, for example, to select answer choices, options which the above described answer form fails to provide.

For the foregoing reasons, there is a need for a test form having a removable opaque layer (e.g., scratch-off material, rub-off material and peel-off material) in which a user can insert and customize information concealed under the removable opaque layer. There is a further need for a test answer form, preferably formatted as a multiple-choice test answer form, which enables a test administrator to customize answer key combinations by printing user-selected indicia concealed beneath the removable opaque layer, thereby enhancing flexibility, security and integrity of the administered test. There is also a need for a method and system for customizing such test answer forms in a convenient manner while keeping the structure of the removable opaque layer intact.

SUMMARY OF THE INVENTION

An object of the invention is to provide a document useful for preparing test answer forms, and providing programmed learning exercises.

An object of this invention is to provide a test answer form, preferably for multiple-choice examinations, that can be administered to a large number of test takers to assess their knowledge of examination questions while at the same time teaching them the answers to the questions that they initially answered incorrectly.

Another object of the invention is to provide an immediate feedback multiple-choice examination form designed to confirm to a test taker his/her correct responses and incorrect responses.

Another object of the invention is to enable a test administrator to allocate partial credit for a correct response to a question that was made subsequent to a previous incorrect response or responses to that question on a multiple-choice answer form for one embodiment of the invention.

Another object of the invention is to enhance flexibility, security and integrity of the test form of the present invention.

Another object of the invention is to enable a test administrator to prepare a test answer form by enabling the selection and customization of multiple choice answer key combinations on the form.

The present invention is directed to a test form having a substrate layer, a chromogenic material (or color changing material) applied to the substrate layer, and a removable opaque layer overlaying the chromogenic material. The chromogenic material is adapted to visibly change color in a selected area, upon exposure of the area to an activating agent such as heat, light, radiation, radio frequency signal, and the like. The test form of the present invention is adapted to enable a user to print indicia by selectively activating portions of the chromogenic material with a suitable activating agent to irreversibly yield a visible color change to form an indicia or image while keeping the structure of the removable opaque layer intact. After the selective activation process, the produced indicia or image remains hidden under the removable opaque layer until it is revealed by the removal of the removable opaque layer such as through scratching, for example.

Optionally, the test form can further comprise portions of the substrate having only the chromogenic material exposed without the removable opaque layer to permit an indicia or image to be applied thereon using an activating agent or other suitable printing methods as known in the art. In a preferred embodiment of the present invention, the form is a test answer form.

In one aspect of the present invention, with the problems of the prior art in mind, various objects of the invention are provided by a novel test answer form, preferably having a varying number of rows and columns, depending upon the particular test application. The numbered rows corresponding to the number of questions on the examination, and the columns corresponding to the answer choices (A, B, C, D etc.) to each of the test questions. Each answer choice of the test answer form is covered with a removable opaque layer or covering capable of being removed, scratched-off, or rubbed off by the test taker. The correct answer selection to a question is immediately discernible by an exposed image, indicia or indicator under one of the answer choices in a row of options, while an incorrect answer selection is indicated, for example, by a blank space in that row.

Consequently, the test answer form indicates to the test taker immediately whether his response is correct or incorrect. If incorrect, the test taker selects a second preferred alternative answer choice and removes, scratches, rubs or lifts the opaque layer or coating off of that answer choice on the test answer form. The test taker continues in a similar manner until a correct answer selection is indicated. The test administrator can determine if the test taker responded correctly on the first, second or later answer selections by the number of answer spaces exposed.

In one aspect of the present invention, there is provided a test form which comprises:

a substrate;

a chromogenic material applied to at least a surface portion of the substrate, the chromogenic material being adapted to irreversibly generate a visible change in color in a selected area, upon exposure of the area to an activating agent; and a removable opaque layer overlaying at least a surface portion of the chromogenic material.

In a particular aspect of the present invention, there is provided a test answer form which comprises:

a substrate;

a plurality of answer spaces printed on the substrate, each associated with an answer choice of a corresponding test question;

a chromogenic material applied to at least a surface portion of the substrate including portions printed with the plurality of answer spaces, the chromogenic material being adapted to irreversibly generate a visible change in color in a selected area, upon exposure of the area to an activating agent; and a removable opaque layer overlaying at least a surface portion of the chromogenic material at each location of the plurality of answer spaces on the substrate.

BRIEF DESCRIPTION OF THE DRAWINGS

The various embodiments of the invention are described in detail below with reference to the drawings, in which like items are identified by the same reference designation, wherein:

FIG. 1 is an elevational view of a test answer form having a removable opaque layer covering each answer space in one embodiment of the present invention;

FIG. 2 is an elevational view of the test answer form of FIG. 1 having printed indicia within the answer spaces without the removable opaque layer in accordance with the present invention;

FIG. 3 is an elevational view of an test answer form without the removable opaque layer showing printed indicia within the answer spaces designating a different answer key combination in accordance with the present invention;

FIG. 4 is an elevational view of the test answer form of FIG. 3 as it would appear during an examination, with an example of the opaque layer or covering of choices 1 through 12 as removed by the test taker;

FIG. 5 is an elevational view of the answer form of FIG. 3 having removable opaque layers where some of the opaque layers for Questions 1 to 10 were removed by the test taker to illustrate a typical full and partial scoring system;

DETAILED DESCRIPTION OF THE INVENTION

Figure 6:
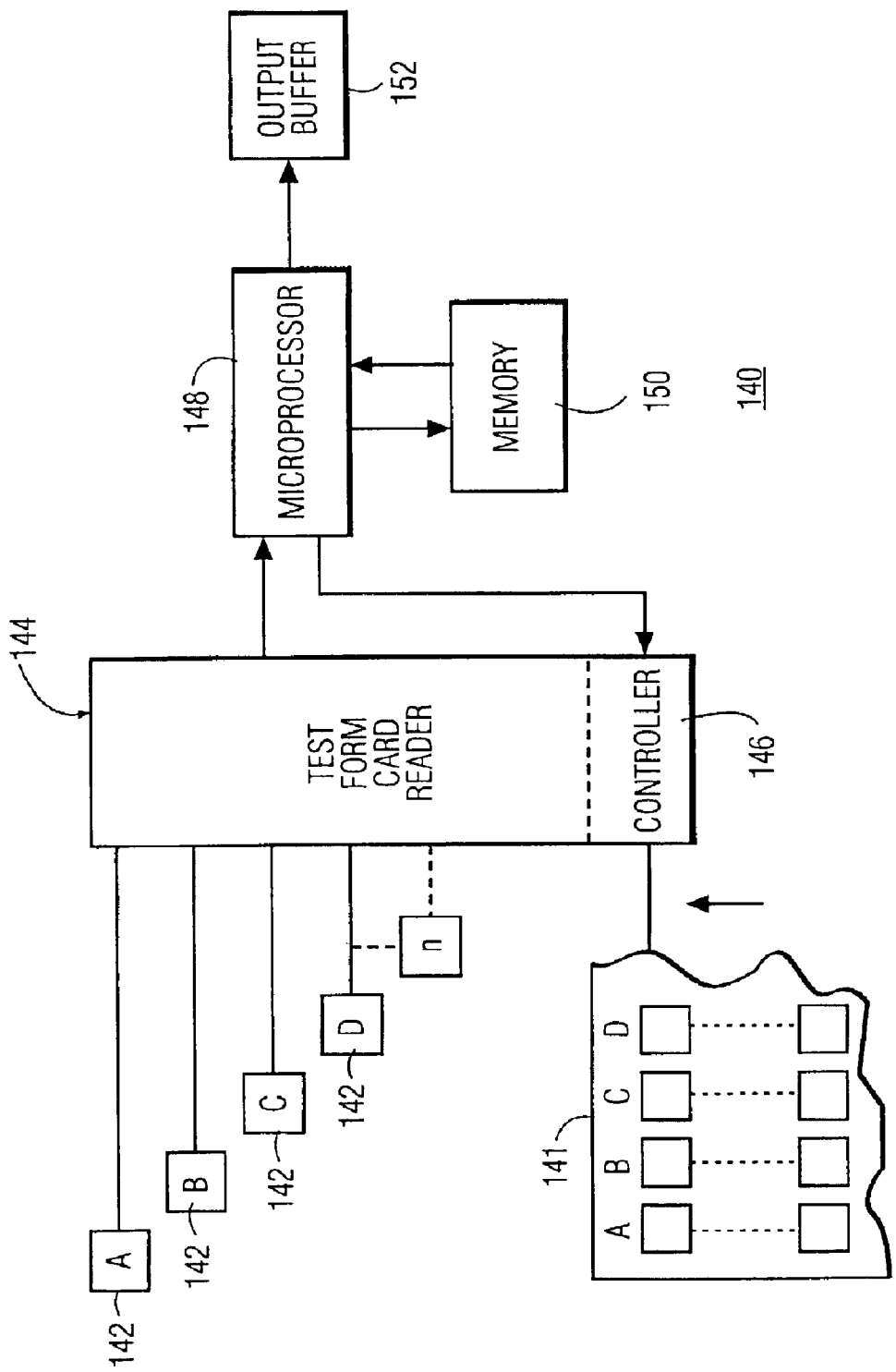
FIG. 6 is a simplified block diagram of an apparatus for automatically scoring test answer forms in accordance with the present invention.

The present invention relates generally to a test form having a substrate treated via impregnation thereof with a chromogenic material, or coating with a chromogenic layer, wherein the chromogenic material or layer is adapted to generate a visible change in color in an area or areas exposed to an activating agent such as heat, for example. In one aspect of the present invention, the chromogenic layer or material of the form can be deposited on the entire surface or in select areas of the substrate. The test form of the present invention further includes a removable opaque layer covering at least a portion of the chromogenic layer or material. The test form of the present invention enables a user to selectively activate at least one portion of the chromogenic layer or material with the activating agent to produce indicia on the form especially beneath the removable opaque layer. In this manner, the user can customize indicia produced beneath the removable opaque layer and effectively maintain its concealment until the opaque layer is removed.

The test form of the present invention is adapted to enable a user to print information on the substrate thereof through chromogenic printing techniques as known in the art, especially those for concealment beneath the removable opaque layer while keeping the structure of the removable opaque layer intact. The test form is also adapted to enable the user to print information on portions of the substrate not covered by the removable opaque layer through chromogenic printing as described above or through other suitable printing methods. In a preferred embodiment, the test form of the present invention includes a chromogenic layer which generally comprises a substance or material that is capable of irreversibly generating a visible change in color in a selected area, upon exposure of the area to an activating agent such as heat, radiation, light, radio frequency signals and the like. The more preferred of the chromogenic substances or materials suitable for use in the present invention are those that undergo a visible change in color upon exposure to heat. Also in the preferred embodiment, the chromogenic material or substance is applied as a layer or coating covering the entire surface of the substrate or selected portions thereof.

In a preferred embodiment of the present invention, the test answer form has a multiple-choice type of arrangement or format, for example.

Although the document of the present invention is shown and described in the form of test answer forms, it will be understood that the document of the present invention is not limited to test answer forms. Also, the below description of various embodiments of the present invention is directed to the preferred use of a layer or a plurality of layers of chromogenic substance or material on the substrate, but the present invention is not meant to be so limited in that as previously described, the chromogenic substance or material may in certain applications be impregnated into the substrate itself.

The present invention is further directed to a test answer form having a removable opaque layer and that is capable of being printed chromogenically, and method and system for customizing such test answer forms. The test answer forms of the present invention can be customized by the user by exposing at appropriate locations of the test answer form a suitable activating agent to activate the chromogenic portions of the test answer form and correspondingly generate appropriate indicia and images thereon. The test answer form of the present invention includes a substrate supporting a chromogenic substance and a removable opaque layer covering the chromogenic substance. In a preferred embodiment of the present invention, the test answer form further includes a plurality of answer spaces each having a chromogenic layer and a removable opaque layer applied thereon, wherein the answer spaces are arranged in X rows and Y columns, with each row being associated with a particular question, and each column with a possible answer choice in one embodiment of the present invention.

Figure 1:
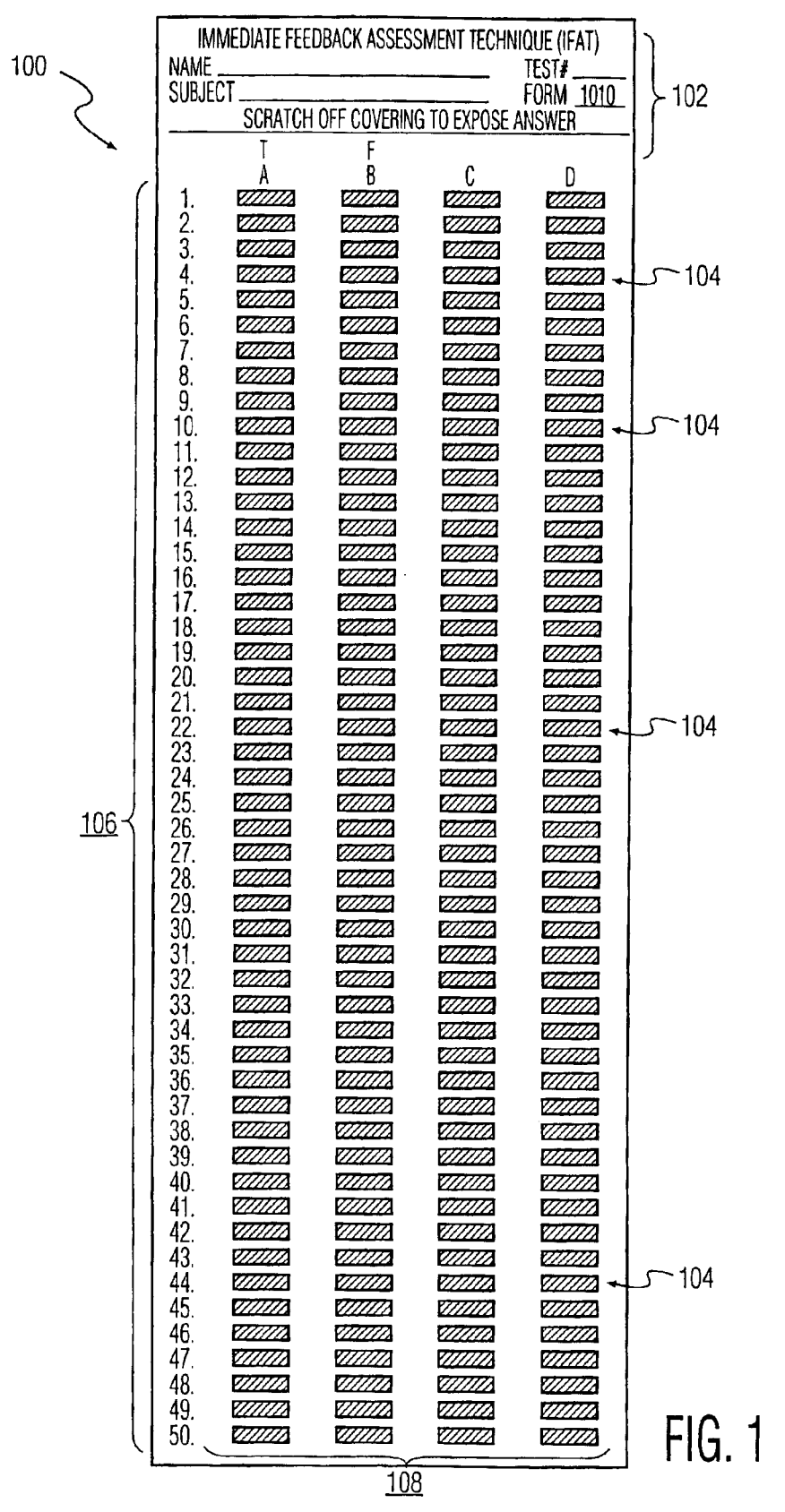

With reference of FIG. 1, a test answer form 100 for one embodiment of the present invention is shown to generally illustrate the features thereof. The test answer form 100 includes a test answer choice matrix printed thereon. In this embodiment, the form includes a heading 102 with appropriate spaces to record information corresponding to the test taker such as name, identification, subject, test number and other related identification information. The test answer form 100 further includes an array of answer spaces 104 consisting of X rows 106 thereof and Y columns 108 thereof which provides Y number of answer choices for each question X to yield a multiple-choice test format. Each of the answer spaces 104 is covered by a removable opaque layer that can be scratched, rubbed or lifted off to reveal the space underneath. The test answer form 100 includes rows 106 numbered from (1.) to (50.) to accommodate up to fifty (50) questions and four columns 108 labeled A, B, C, and D, respectively to accommodate up to four answer choices for each question. In the alternative, columns A and B can also be labeled T and F to accommodate "true or false" type of questions. The test answer form format, appearance and arrangement can be modified according to the testing goals and requirements of the test administrator as known to one of ordinary skill in the art.

Figure 2:
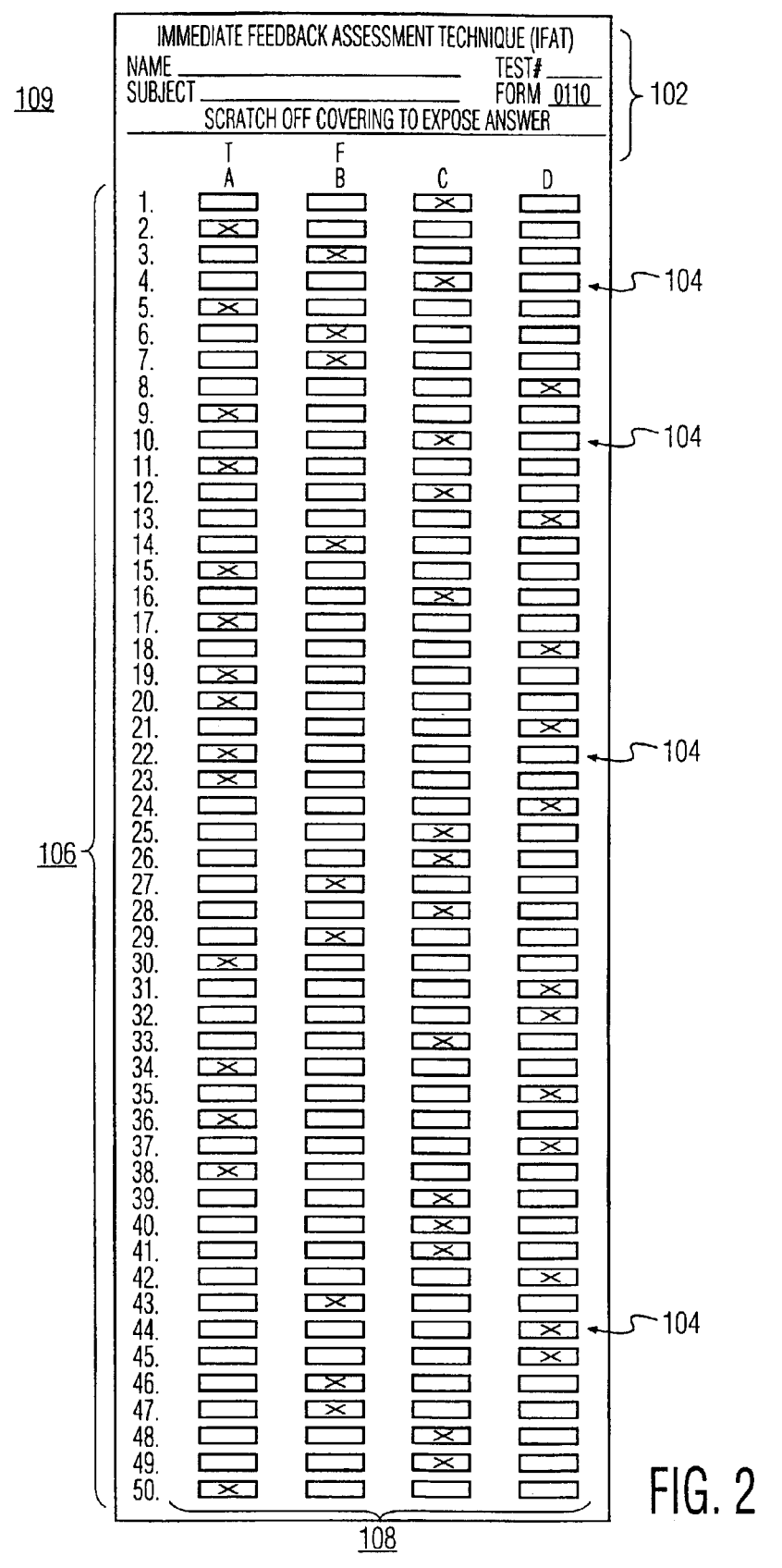

In reference to FIG. 2, a test answer form 109 with all the answer spaces 104 exposed to illustrate the type of information that can be printed under the removable opaque layer. Each row 106 of the test answer form 109 includes an answer space 104 that is marked with an indicia (e.g., "X") to indicate it as being a correct answer choice. For example in row number 12, the answer space 104 in column C includes an "X" to indicate that answer choice to be correct, and that the other answer spaces 104 in columns A, B, and D are incorrect. It is understood that other indicators or indicia other than an "X" can be used to designate correct or incorrect answer choices.

In FIG. 3, a test answer form 112 is shown for an alternative embodiment with an answer key combination that is different from the form 109 shown in FIG. 2, as it would appear without the removable opaque covering. In this form 112, the correct answer choice for row number 12 is indicated by the indicia "X" in the answer space 104 in column A.

Figure 4:
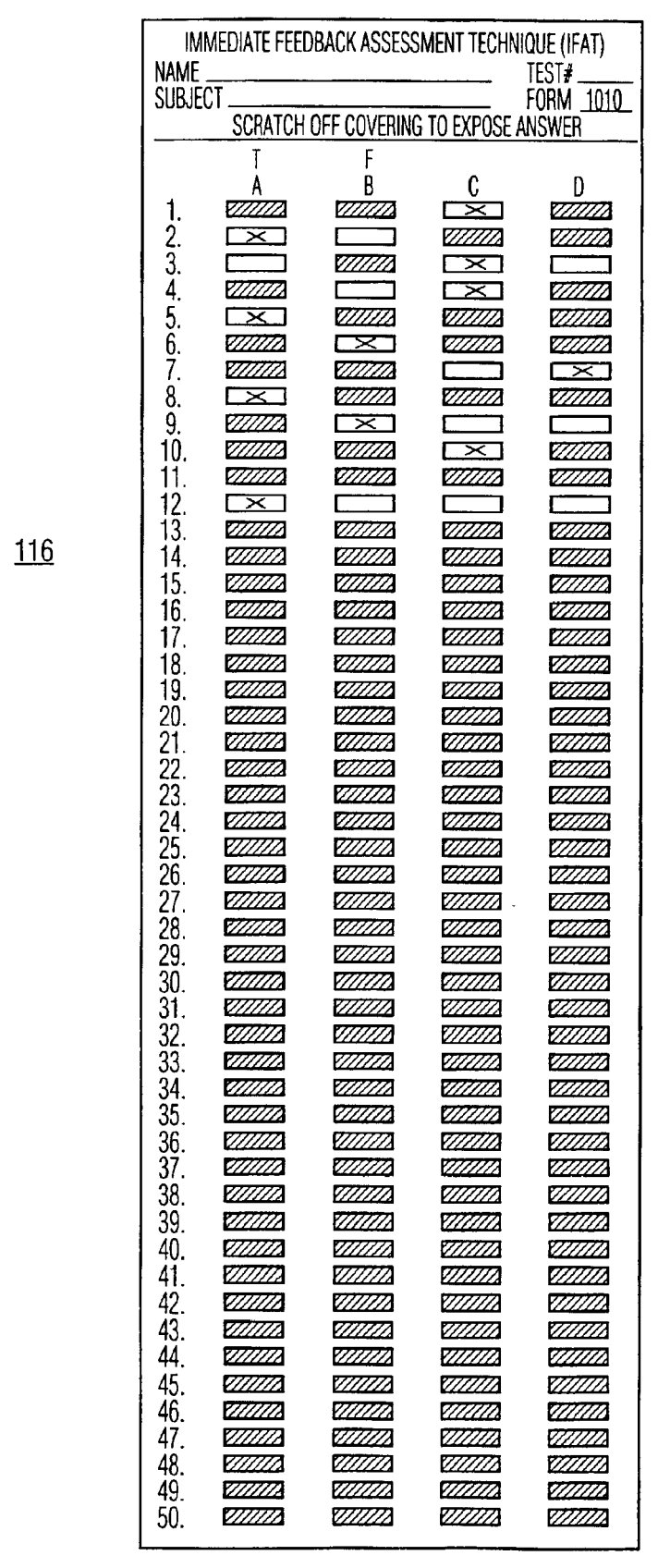

FIG. 4 shows an embodiment of a completed answer form 116. In particular, with respect to form 116, row number 1 illustrates an answer choice uncovered in column C to a question wherein the test taker obtained the correct answer on the first attempted answer selection, because it is the only answer choice that is revealed by scratching or rubbing off. The test taker's selection in row 4 reveals two revealed answer choices in columns B and C, indicating that the test taker had made two answer selections by removing the opaque layers to reveal the correct alternative in column C for that particular corresponding question. The test taker's answer selection in row 9 indicates the test taker had made three answer selections to reveal the correct answer in column B. In row 12 the correct answer selection was not made until the test taker's fourth attempt in column A.

Figure 5:
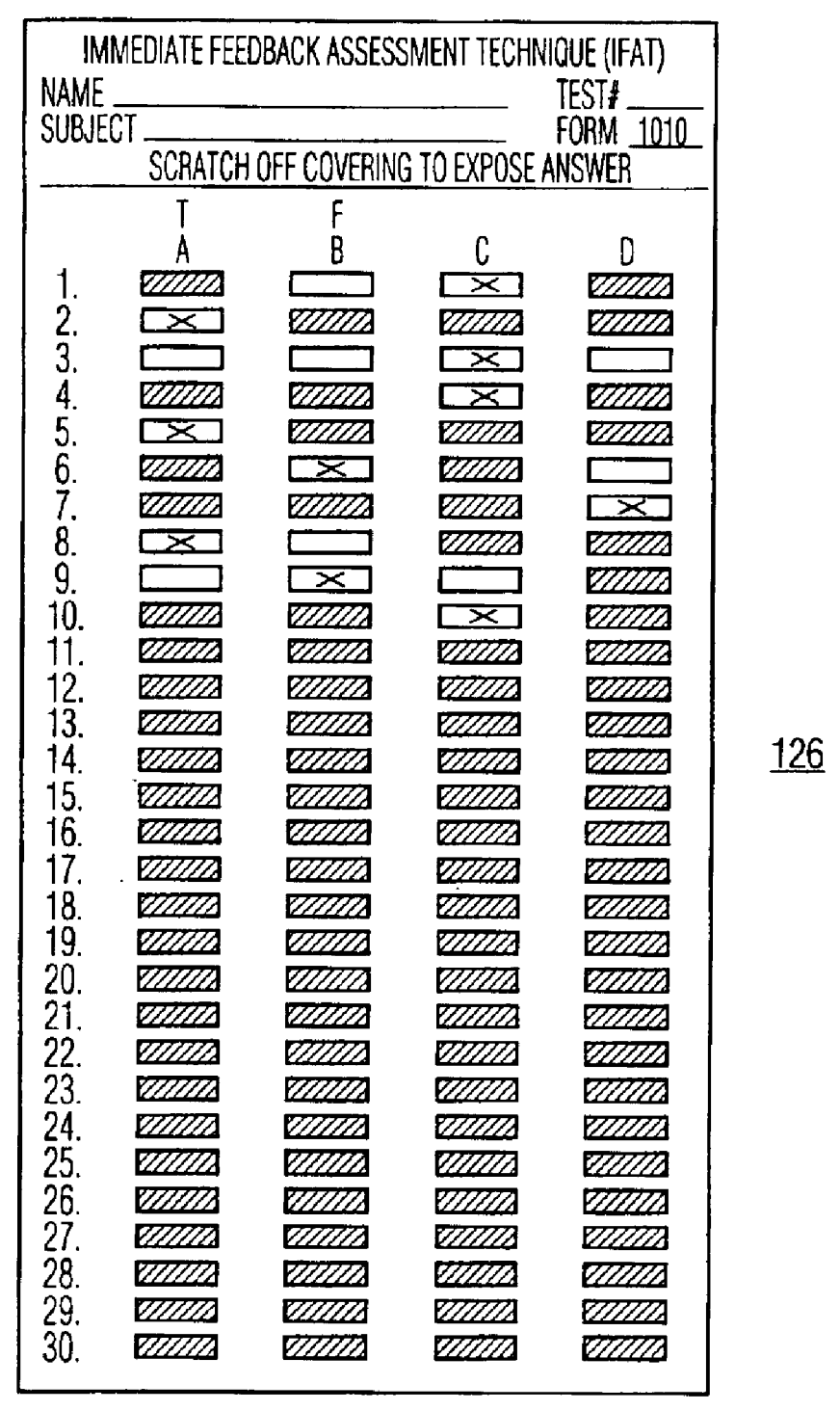

Referring to FIG. 5, a test answer form 126 with four columns and 30 rows of answer spaces is shown for another embodiment of the present invention where rows numbered 1 through 10 have been uncovered by a test taker. It is noted that the form 126 can be adapted to designate full, partial or no credit for selection of the answer choices. For example, a correct answer choice in row number 2 is revealed in column A, with a score of "2" for full credit in this example, a correct answer choice in row number 6 required two selections to be made by the test taker before it was revealed in column B, with a partial credit score of "1" being granted, and a correct answer choice in column B in row number 9 required three selections to be made by the test taker before it was revealed, yielding a partial credit score of "½", for example. The correct total answer choices accrued by the test taker would be 13.5 for the ten questions answered using the scoring method described in this embodiment. It is understood that other scoring procedures with differing amounts of partial credit can be used, and this example is not meant to be limiting.

With reference to FIG. 6, a simplified block diagram of an automated scoring apparatus 140 for one embodiment of the present invention is shown. The apparatus 140 can be used to score a test answer form 141 similar to the forms shown in FIGS. 1 through 5 as described above. The apparatus 140 for scoring multiple-choice answer forms comprises a card reader 144 having a plurality of detectors 142 for reading each answer space to determine whether the removable opaque layer at a particular answer space has been removed. The number of detectors 142 is preferably equal to the number of columns 108 in the test answer form. The card reader 144 includes a controller 146 responsive to control signals for moving an answer form 141 across detectors 142.

A microprocessor 148 is programmed to receive answer choice signals and compare the answer choices for each question with the correct choices. The microprocessor 148 is further programmed to provide control signals to the controller 146 for advancing the answer form row-by-row, as each row is read by the detectors 142 and processed by microprocessor 148. As each row is read, the microprocessor 148 calculates the score for each answer, giving full credit for a correct choice and less than full credit for answers containing incorrect choices. The microprocessor 148 is also selectively programmable to read various answer format configurations for various answer formats for different embodiments of the invention. The microprocessor 148 is programmed to calculate a total score for all of the test questions on an answer form 141, and can also be programmed to perform other calculations as required by the examination administrators.

Optionally, the answers and the total score can be stored in a memory 150 for future use. Finally, the answers and the score can be made available at an output port 152 for external access for such purposes as recording or displaying test results.

In each of the forms of various embodiments of the invention, the prospective answer spaces 104 are printed onto a suitable substrate material of paper or cardboard, for example. Each possible answer space 104 is covered with a removable opaque layer. The test taker can scratch, erase, remove or lift the opaque layer from a selected answer space 104 to record his or her answer corresponding to a question. Alternatively, a chemical coating can be used to obscure the answer spaces, which can thereafter become irreversibly transparent upon applying a reagent from a pen or stylus by the test taker during the test which renders the chemical coating transparent. Another alternative for the removable opaque layer is to use peel-off material. One typical machine-readable opaque layer that can be used in the present invention is an electrically conductive film, in which the test taker's choice is detected by a change in the conductivity. Other techniques for detecting the change in opacity such as by measuring the transmission of light through the answer spaces or the reflection of light from the surface of a reflective opaque layer can be used. Further, pattern recognition techniques using appropriate electro-optical systems and software can also be used.

A typical set of instructions for a test taker to use a test answer form of the present invention, may include the following steps.

1) Upon reading an examination question, select one of the answer choices (A, B, C, or D) that best answer the question.

2) Consider each answer choice carefully; partial credit may be given for correct responses on second or later attempts.

3) Identify the answer space (A, B, C, or D) on the answer form that is appropriate for that alternative.

4) Carefully remove off the removable opaque layer to completely reveal the space beneath that alternative.

5) If an "X" marker is exposed in the answer space, your response is correct.

6) However, if the area exposed in the answer space is blank, your response is incorrect, and you must then proceed as follows:

a) Consider the question and remaining response alternatives again and select the best response from the remaining alternatives.

b) Identify the appropriate answer space for that alternative and remove its opaque layer.

c) Continue in this manner until you have exposed the correct alternative indicated by the "X" marker beneath the opaque layer.

Figure 7:
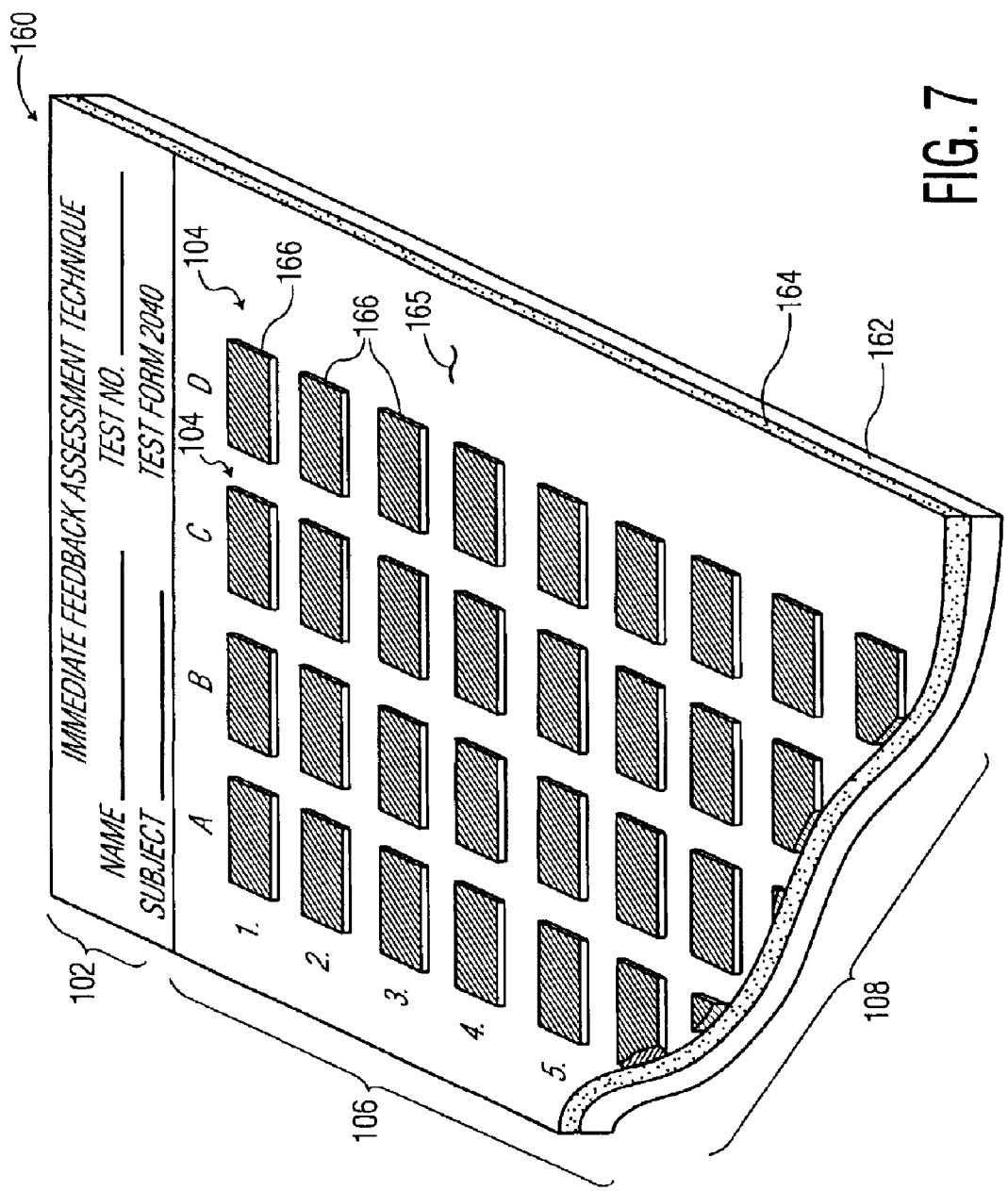
FIG. 7 is a perspective view of a test answer form illustrating a substrate supporting a thermal sensitive color changing layer and a removable opaque layer covering the color changing layer in accordance with the present invention.

With reference to FIG. 7, a test answer form 160 having a test answer selection matrix printed thereon is shown for another embodiment of the present invention. The form 160 includes all the similar features of the form 100. The form 160 includes a base substrate 162 composed of a suitable material which is capable of receiving printing thereon such as paper, synthetic film, foil, coated board and the like, a chromogenic layer 164 capable of visibly changing color in a desired area upon exposure of the area to an activating agent to form an image, indicia or indicator, and a removable opaque layer 166 covering select locations of the substrate 162 over the chromogenic layer 164, preferably at each answer space or location 104 thereof.

In the present invention, the form 160 is specifically adapted for chromogenic printing which includes, but is not limited to thermal printing. The term "chromogenic printing" generally refers to a process for producing images or indicia on a printable substrate having a preapplied layer 164 of a chromogenic substance or material that is sensitive to a particular activating agent such as heat, and exposure of such chromogenic layer to the activating agent at selected locations on the substrate to generate a visible change in color to yield a corresponding mark, indicia, image or indicator thereon as known to one skilled in the art.

An example of a chromogenic image producing process is thermal activated printing or simply thermal printing which is commonly used for many applications including, but not limited to, facsimile, ticketing and cash register receipt applications. The chromogenic printing procedure as applied in the present invention enables the test administrator to select the correct answer options at particular locations on the form without disturbing the removable opaque layer or leaving visible marks on the surface of the present form. In this manner, the test administrator is able to customize and to vary the answer pattern for the corresponding test questions, thereby substantially enhancing test security and reducing answer choice predictability. In the present invention, the activating agent is preferably an agent which is capable of passing inertly through the substrate or the opaque layer without leaving a visible mark or indication thereon and activate the corresponding areas of the chromogenic layer or material. Examples of suitable activating agents include heat, radiation, light, radio frequency signals and the like.

Referring to FIG. 7, the base substrate 162 can be comprised of any suitable material including paper, synthetic film, foil, coated board and the like. The thickness and weight of the base substrate 162 can vary depending on the base material used. The substrate 162 can be preprinted with indicia using any suitable printing methods. The base substrate 162 can be adapted to support printed indicia including the array of answer spaces 104 comprising X rows 106 and Y columns 108 along with the chromogenic layer 164 and the removable opaque layer 166 disposed on selected surface locations thereof. It is noted that the chromogenic layer 164 can be applied to cover the entire surface of the test answer form 160 or limited to the answer spaces 104, with the removable opaque layer 166 covering the chromogenic layer 164 at each corresponding answer space 104.

The preprinted indicia and the chromogenic layer 164 in the present invention, can be applied using conventional methods such as intaglio printing, screen printing, relief printing, planographic printing, letterpress printing, and flexographic printing, for example. The removable opaque layer 166 is generally composed of a removable opaque material such as a scratch-off latex-based material, a rub-off material or a peel-off material, that can be applied through conventional methods to cover the answer spaces 104 over the chromogenic layer 164.

In the preferred embodiment of the present invention, the chromogenic layer 164 of each answer space 104 is generally composed of a thermally sensitive chromogenic substance that is capable of changing color upon exposure to thermal heat. In a more preferred embodiment of the present invention, the chromogenic layer 164 is adapted to irreversibly change from one color (e.g., white) to another color (e.g., black) upon exposure to heat. The chromogenic layer 164 is generally thin, typically a few microns thick, and several layers can be applied as required to meet desired sensitivity, stability and image definition properties as known to those of ordinary skill in the art. The compositions of such thermally sensitive chromogenic substances and methods of applying or coating such compositions on suitable substrates are known in the art, and such chromogenically treated substrate materials are commercially available from manufacturers of thermal print recordable media including International Business Machines Corporation of Armonk, N.Y., and Mark sensing Australia Pty Ltd of Melbourne, Australia.

Optionally, the form 160 can further include a transparent non-scratch off layer 165 interposed or occupying between the chromogenic layer 164 and the removable opaque layer 166 of each answer space 104. The transparent layer 165 can be composed of any suitable transparent inert material including plastic, cellulose, wax and the like which can be adhesively applied to the chromogenic layer 164. The transparent layer 165 serves to preserve the chromogenic layer 164 against adverse environmental effects such as high humidity, heat, or incompatible chemicals, thereby enhancing the storage life of the test form of the present invention.

The transparent layer 165 further provides a barrier between the chromogenic layer 164 and the removable opaque layer 166 to minimize any chemical interaction that may affect the performance of the form of the present invention, to facilitate removal of the removable opaque layer 166, and to insulate the removable opaque layer 166 from the thermal printing process which may potentially leave undesirable markings or impressions that may be visible to the test taker.

As noted above, the base substrate 162 can be coated with a suitable thermally sensitive chromogenic substance over the entire surface or alternatively, over select portions to yield the corresponding chromogenic layer 164. Printed indicia can also be pre-applied onto the substrate 162 to designate the form heading 102, and the array of answer spaces 104 arranged in X rows 106 and Y columns 108. The removable opaque layer is applied over the chromogenic layer 164 at the locations of each answer space 104. When the opaque layer 166 is removed, the information printed thereunder can be revealed.

Generally, only one answer choice in a row 106 of possible answer choices, can be selected by the test administrator to be correct, and that answer selection is indicated by a predetermined thermally printed mark, indicator, image or indicia, in the answer space beneath the selected removable opaque layer 166. Alternative, each of the answer spaces 104 in a given row can be printed with a particular mark or indicia indicating varying point scores from full to partial credit for each answer option. The mark or indicia can be applied through thermal printing by exposing the chromogenic layer 162 of the correct answer space 104 to a sufficient amount of heat to cause the chromogenic layer 162 to produce a visible color change at the selected location.

In another embodiment of the present invention, the entire surface of the base substrate 162 can be treated or coated with the chromogenic layer 162, and the printed indicia can be applied to yield a print procedure in which the test administrator can thermally print the questions and the corresponding answer choices adjacent to the associated answer spaces 104 on the same form, thereby streamlining or reducing the amount of paper used for testing as will be further detailed hereinafter.

Figure 8:
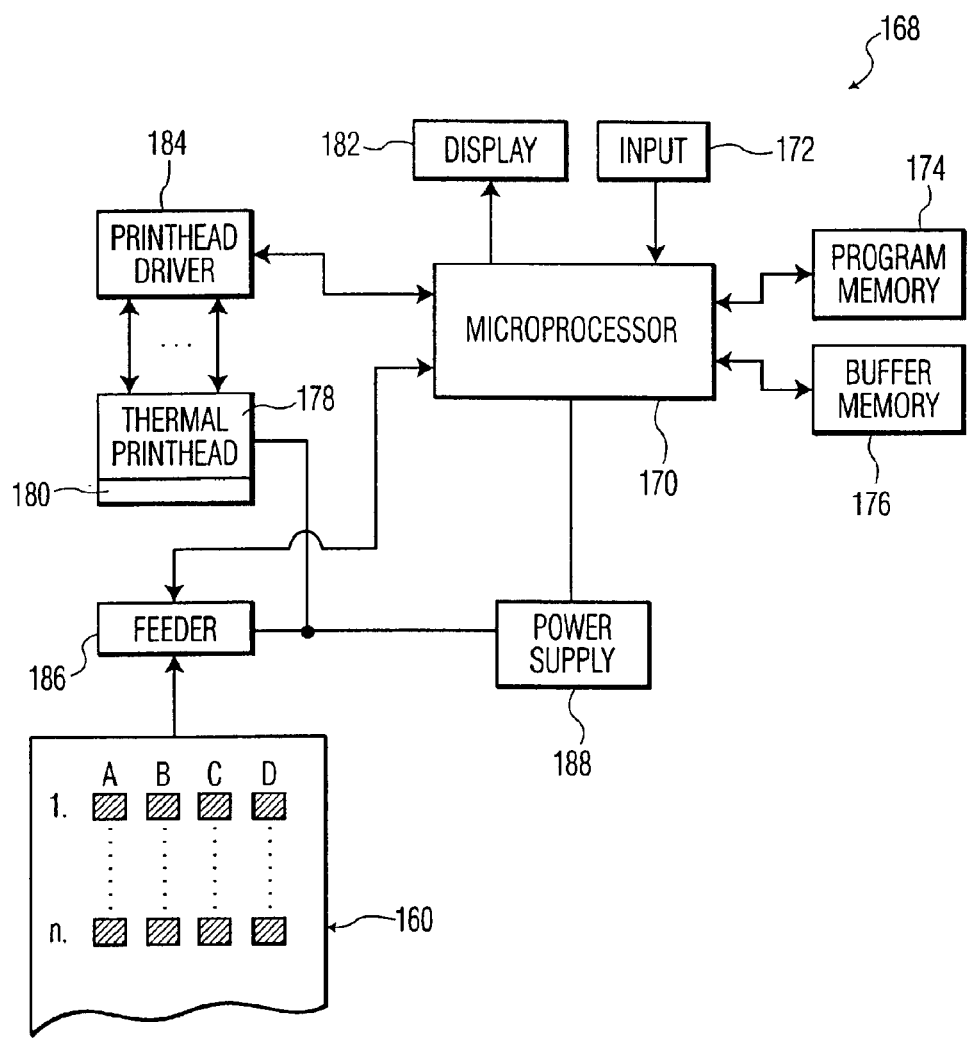
FIG. 8 is a simplified block diagram of a thermal apparatus for customizing the test form in accordance with the present invention.

With reference to FIG. 8, a block diagram of an apparatus 168 for thermally printing thermally printable answer forms of the present invention is illustrated in accordance with the present invention. An apparatus controller 170 typically in the form of a microprocessor, for example, is used to control the chromogenic printing process. An input means 172 which can be a keyboard, mouse or other suitable input device, or an input port for receiving signals from a main computer provided to communicate such input signals along a bus to the microprocessor 170. The microprocessor 170 includes a non-volatile program memory 174 and a volatile memory 176. The memory 176 provides both a buffer memory and registers for programming the microprocessor 170. An operating program is stored in memory 174.

Figure 9:
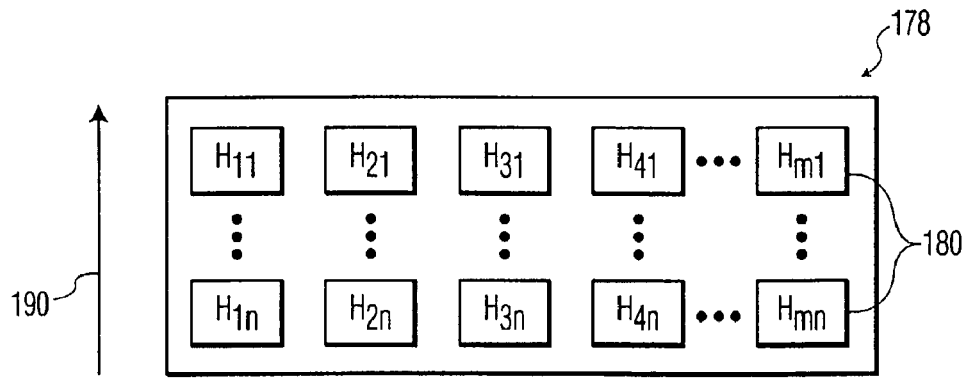
FIG. 9 is an elevational view of a thermal printhead used in the thermal apparatus of FIG. 8.

The microprocessor 170 is programmed to operate a thermal printhead driver 184 which in turn operates a thermal printhead 178 having a plurality of heat generating elements 180 which are illustrated in FIG. 9. The heat generating elements 180 can be selected from any components capable of generating heat such as electrical resistors and laser diodes, for example. The thermal printhead 178 is a fixed matrix array of heat generating elements 180 that operate independently from one another to generate heat in the area under the respective element. Alternatively, the heat generating elements 180 can be arranged in a linear array with one or more of the adjacent elements corresponding to an answer space 104 on the form 160, for example. For resistive heat generating elements, the printhead 178 is adapted to make direct contact with a thermally sensitive (heat sensitive chromogenic) paper, film or the like as current flows through the resistive elements and creates localized heat. According to the intensity of the heat, the chromogenic paper darkens and prints a dot pattern for generating an image with a particular resolution.

The number of heat generating elements 180 varies based upon the application and the printhead 178. However, in one preferred example, 768 heat generating elements can be used and spaced along a length of 65 mm to provide a print density of 300 dots per inch (DPI). The thermal printhead 178 is capable of transferring heat at specific preprogrammed locations (e.g., correct answer spaces) onto the base substrate 162 (see FIG. 7) of the form 160 which is pressed against the printhead 178 by a roller or platen (not shown). It is noted that a printhead/roller or platen interface is usually essential to the thermal printing process as the roller or platen pressure is related to thermal transfer efficiency, and that the dot size versus platen size dictate footprint tolerance. The heat is applied to the corresponding portions of the chromogenic layer 164 to print a mark or indicia under the removable opaque layer 166 of the selected correct answer space 104 in each row 106 without leaving externally visible marks.

During thermal printing, an image line printing signal is produced via programming of the microprocessor 170 via the user operated input means 172, such as a keyboard. The programming or inputted printing signal is stored in the buffer memory 176. The driver 184 includes one driver 180 for each heat generating element 180. When a particular driver 180 is activated, electrical current flows into the heat generating element to which it corresponds. The apparatus 168 includes a feeder 186 controlled by the programming of the microprocessor 170 for advancing and properly positioning the form 160 relative to the printhead 178. The components of the apparatus 168 are powered by a suitable power supply 188.

With reference to FIG. 9, a diagrammatic view of the active end of the thermal printhead 178 showing the heat generating elements 180 labeled $H_{11}$ to $H_{mn}$ where m is equal to the number of columns of heat generating elements and n is equal to the number of rows of heat generating elements on the thermal printhead 178, and therefore is also equal to the number of pixels per line to be printed on the base substrate 162 of the form 160 through thermal reaction of the chromogenic layer 164 beneath the removable opaque layer 166. The base substrate 162 of the form 160 can be advanced by the feeder 186 past the stationary thermal printhead 178 in the direction identified by arrow 190. As the base substrate 162 of the form 160 is advanced, the heat generating elements 180 each print their respective groups of pixels for printing multiple rows 106 simultaneously. In this embodiment, the thermal printhead 178 can be adapted to print one or multiple lines at one time. Alternatively, the thermal printhead 178 can be dimensioned to include a linear array of larger heat generating elements, to enable a single row 106 of answer spaces 104 to be printed at one time.

The printhead 178 includes a series of integrated circuits, each responsible for controlling a group of heat generating elements. In accordance with one preferred printhead which is available from Kyocera of Kyoto, Japan, a printhead is used which includes ten such integrated circuits, each controlling ninety-six heat generating elements. In one embodiment of the invention, only eight such integrated circuits are used to control a total of seven hundred and sixty-eight resistive elements. Each integrated circuit includes a data input capable of carrying one byte of information.

The programming, in one embodiment of the present invention, upon receipt of an appropriate query from a user via the input means 172 to call up a display 182 a graphical representation of a form 160, for example, to be coded for printing. The user can then use a keyboard, a mouse or other suitable input means 172 to select each row of the answer spaces to be coded via printing an image or indicia. The microprocessor 170 will then be programmed to activate te appropriate corresponding heat generating elements 180 to heat the chromogenic material at the selected answer spaces when the form 160 is moved by the feeder 186 into position under the printhead 178. The programming and the printhead 178 can be configured or coded for printing one line at a time, or all the lines simultaneously. For one line coding, printhead 178 will have only a single row of heat generating elements 180, and for whole form encoding, the printhead 178 may have a matrix of heat generating elements 180 arranged in rows and columns in correspondence to the answer spaces of the forms to be coded, for example. Each heat generating element 180 can itself be comprised a matrix of heat generating components for permitting a user to print desired indicia or designs in the selected answer spaces of the test answer form of the present invention.

The answer forms 160 of the present invention can also be thermally printed by utilizing commercially available thermal printers that are commonly used for printing facsimile transmissions, receipts for sales of goods, shipping labels, tickets, plotting information, and the like. Moreover, no adjustments to the current printing equipment are required to print onto the test answer forms of the present invention. Commercially available thermal printers include the DPU series manufactured by Seiko Instruments USA Inc. of Torrance, Calif., the IBM 4400 Thermal Printers manufactured by International Business Machines Corporation, or the Epson M-T series manufactured by Epson America, Inc. of Long Beach, Calif.

Figure 10:
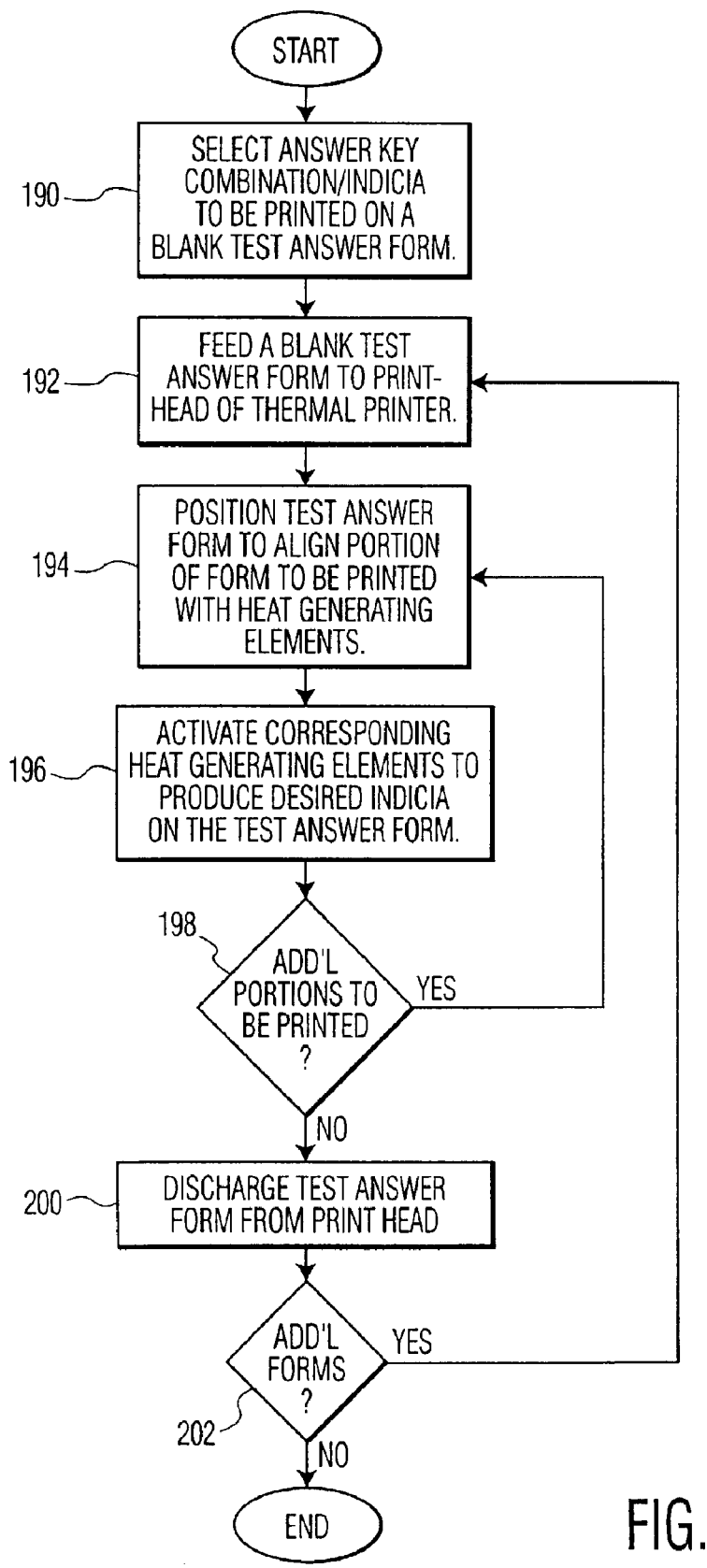
FIG. 10 is a flowchart detailing printing operation of the thermal apparatus represented in FIG. 8.

With reference to FIG. 10, an algorithm for customizing thermally printable answer forms of the present invention is illustrated in accordance with the present invention. In step 190, the test administrator inputs into the apparatus 168 via input means 172 the print pattern corresponding to selected correct answer spaces on the test answer form by selecting an answer key combination or pattern corresponding to the test answer form. In step 192, the apparatus 168 feeds a test answer form 160 to the printhead 178 to begin a printing operation. In step 194, the feeder 186 of the apparatus 168 positions the form 160 relative to the printhead 178 to initiate printing. In step 196, the corresponding heat generating elements 180 are activated to apply heat to the correct answer space 104 to print a mark. In query step 198, the apparatus 168 determines whether there are additional rows 106 to be printed such as by using optical sensors to detect the premarked position indicators or from inputs of the preprogrammed print instructions. If the query is in the affirmative, the algorithm goes to step 194 to print the next line. If the query is in the negative, the algorithm proceeds to step 200, where the form 160 is discharged from the printhead 178. The algorithm proceeds to step 202 to query if addition forms require printing by receiving input from the feeder or simply from inputs of the preprogrammed print instructions. If the query is in the affirmative, the algorithm goes to step 192 to feed the next form. If the query is in the negative, the algorithm terminates the process.

Figure 11:
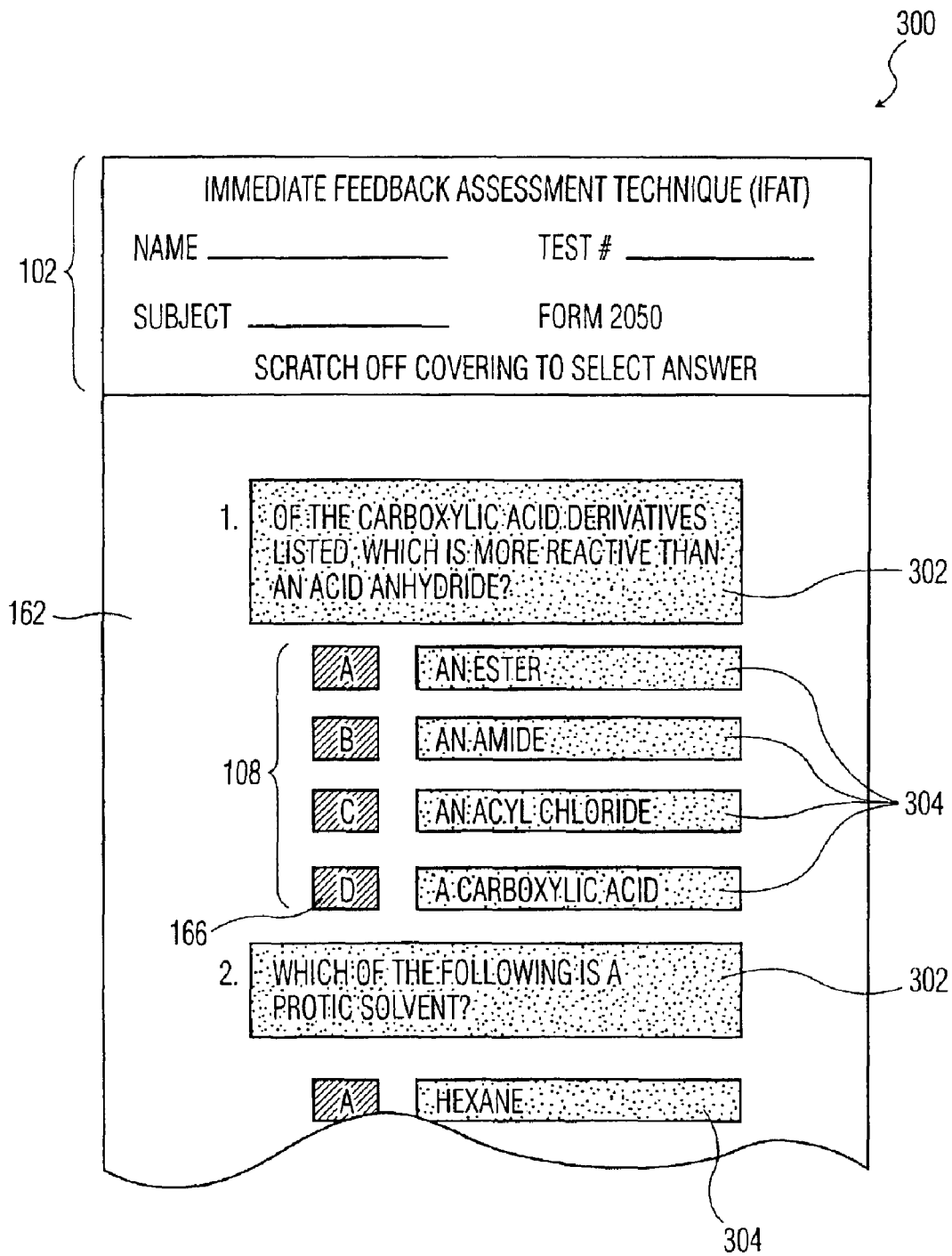
FIG. 11 is an elevational view of a test answer form for another embodiment of the present invention.

With reference to FIG. 11, an alternate embodiment of a test answer form 300 is shown. In this embodiment, the form 300 includes areas 302 and 304 which include a chromogenic layer 164. Using the same apparatus for thermally printing the test answer forms as described above, the user can further print indicia representing test questions in corresponding areas 302 and indicia representing test answers in corresponding areas 304 of the form 300 simultaneously as the printing of indicia beneath the opaque layers 166 is generated. Alternatively, the indicia representing questions and the answers can be printed through other print methods as known in the art.

Although various embodiments of the invention have been shown and described, they are not meant to be limiting. Those of skill in the art may recognize various modifications to these embodiments, which modifications are meant to be covered by the spirit and scope of the appended claims.

What is claimed is:

1. A test answer form comprising:
    a substrate having top and bottom surfaces;
    chromogenic material applied to at least a top surface portion of said substrate, said chromogenic material being adapted to irreversibly generate a visible change in color in a selected area, upon exposure of the area to an activating agent;
    a plurality of answer spaces printed on said chromogenic material, said plurality of answers spaces being arranged in X rows and Y columns, with each row being associated with a particular question, and each column with a possible answer choice wherein said chromogenic material can be activated by the activating agent to provide desired indicia in selected areas; and
    a removable opaque layer overlaying at least a surface portion of the chromogenic material at each location of said plurality of answer spaces on said substrate, said opaque layer being present during application of said activating agent to conceal the indicia generated in said chromogenic material associated with the corresponding answer spaces.

2. The test form of claim 1, wherein the chromogenic material is in the form of a layer or coating.

3. The test form of claim 1, further comprising indicia applied on said substrate.

4. The test form of claim 1, further comprising indicia applied on said chromogenic material.

5. The test form of claim 1, further comprising indicia applied on said removable opaque layer.

6. The test form of claim 1, wherein the activating agent is heat.

7. The test form of claim 1, wherein the substrate further comprises indicia printed on said removable opaque layer.

8. The test form of claim 1, wherein the activating agent is selected from the group consisting of heat, light, radiation, and radio frequency.

9. The test form of claim 1, further comprising a transparent, non-removable layer interposed between the chromogenic material and the removable opaque layer.

10. The test form of claim 1, wherein said removable opaque layer further comprises a member selected from the group consisting scratch-off materials, rub-off materials and peel-off materials.

11. The test form of claim 10, wherein the scratch-off material is a latex-based material.

12. The test form of claim 1, wherein the substrate is selected from the group consisting of paper, plastic, metal, and combinations thereof.

13. A method for making a test form capable of being irreversibly and selectively encoded with desired indicia, said method comprising the steps of:
    applying a chromogenic material on a substrate, said chromogenic material being adapted to irreversibly generate a visible change in color to form desired indicia in a selected area, upon exposure of the area to an activating agent; and
    applying a removable opaque layer over said selected area or areas of the substrate over the chromogenic material, whereby said opaque layer is present during application of said activating agent, to conceal said indicia generated in said chromogenic material until such time that the corresponding overlaying opaque layer is removed; and
    exposing a selected area of said opaque layer overlying said chromogenic material to the activating agent to generate in the underlying said chromogenic material an image or indicia said exposing step including processing the form through apparatus selected from the group consisting of heat apparatus, light radiating apparatus, and radio frequency apparatus.

14. The method of claim 13 wherein the substrate comprises a plurality of answer spaces printed on said substrate, each associated with an answer choice of a corresponding test question; and the chromogenic material overlaying portions of the substrate printed with said plurality of answer spaces.

15. A system for secretly customizing a test form, comprising:
    a substrate;
    a chromogenic material applied to at least a surface portion of said substrate, said chromogenic material being adapted to irreversibly generate a visible change in color to generate a desired indicia in a selected area, upon exposure of the area to an activating agent;
    a removable opaque layer overlaying said chromogenic material before application of said activating agent thereto, to conceal indicia later formed in said selected areas; and
    a printing apparatus adapted for selectively applying the activating agent on select portions of the opaque layer covering said chromogenic material of the substrate to produce indicia thereon.

16. The system of claim 15, wherein the substrate includes a plurality of answer spaces printed on said chromogenic material, each associated with an answer choice of a corresponding test question to provide said test form as a test answer form, and said removable opaque layer overlaying the chromogenic material at each location of said plurality of answer spaces on said substrate.

17. The system of claim 16, further comprising a scoring apparatus for automatically scanning said answer spaces to score a completed test answer form based upon the number of answer spaces uncovered for each question on a weighted basis; and a plurality of sets of a limited number of said test answer forms being provided for any one test, whereby each set of forms differs from any other of said plurality of sets of test forms in the arrangement of the X rows and Y columns for like questions and respective answers.

18. The system of claim 17, further comprising means for calculating a score for each question requiring an answer, said calculating means being programmable for giving full credit for a correct choice where only one answer space has opaque material removed in a given row and that space represents a correct answer, and less than full credit for a row in which the opaque material has been removed from more than one answer space, inclusive of the correct answer space.

19. The system of claim 17, wherein said test answer form includes a heading for recording desired information.

20. The system of claim 17, wherein said scoring apparatus includes:
   a card reader including:
      a plurality of detector means for reading answer choices at each answer location in each row of a test answer form, and
      providing answer choice signals indicative of answer choices made for a given question on a test answer form;
   control means responsive to control signals for advancing said test answer form row-by-row past said detector means;
   microprocessor means programmed for both providing said control signals to said control means, and for receiving said answer choice signals for calculating the score for each question and the total test score; and
   output port means for outputting examination score data from said microprocessor.

21. The system of claim 20, wherein said scoring apparatus further includes memory means for storing the answers and the total score for a plurality of successively scored test answer forms.

22. The system of claim 20, wherein said microprocessor means is programmed to perform partial credit scoring.

23. The system of claim 15, wherein said removable opaque layer of said test answer form is erasable.

24. The system of claim 15, wherein the removable opaque layer is machine-readable.

* * * * *